(12) United States Patent
Amstutz et al.

(10) Patent No.: US 9,487,046 B2
(45) Date of Patent: Nov. 8, 2016

(54) LAMINATED NON-PNEUMATIC TIRE

(71) Applicant: CATERPILLAR INC., Peoria, IL (US)

(72) Inventors: Aaron K. Amstutz, Peoria, IL (US);
Stephen J. Pierz, Peoria, IL (US);
Thierry A. Marchione, Edgewood, NM (US); Kevin L. Martin, Washburn, IL (US)

(73) Assignee: Caterpillar Inc., Peoria, IL (US)

( * ) Notice: Subject to any disclaimer, the term of this patent is extended or adjusted under 35 U.S.C. 154(b) by 151 days.

(21) Appl. No.: 14/335,241

(22) Filed: Jul. 18, 2014

(65) Prior Publication Data

US 2016/0016433 A1 Jan. 21, 2016

(51) Int. Cl.
*B60B 9/04* (2006.01)
*B60B 9/10* (2006.01)
*B60C 7/24* (2006.01)
*B60C 7/10* (2006.01)

(52) U.S. Cl.
CPC . *B60B 9/10* (2013.01); *B60B 9/04* (2013.01); *B60C 7/10* (2013.01); *B60C 7/24* (2013.01); *B60C 2007/107* (2013.04); *B60Y 2200/22* (2013.01); *B60Y 2200/221* (2013.01)

(58) Field of Classification Search
None
See application file for complete search history.

(56) References Cited

U.S. PATENT DOCUMENTS

| | | | |
|---|---|---|---|
| 650,621 A | 5/1900 | Stevens | |
| 1,072,260 A | 9/1913 | Reed | |
| 1,312,491 A | 8/1919 | McClenathen | |
| 1,806,857 A | 5/1931 | Liebau | |
| 2,366,638 A | 1/1945 | Miller | |
| 2,998,053 A | 8/1961 | Appleby | |
| 3,724,521 A * | 4/1973 | Coddington | B60C 17/02 152/340.1 |
| 3,954,538 A | 5/1976 | Grawey | |
| 4,235,270 A | 11/1980 | Kahaner et al. | |
| 7,174,936 B2 | 2/2007 | Becker et al. | |
| 8,636,490 B1 | 1/2014 | Martin et al. | |
| 2005/0133133 A1* | 6/2005 | Becker | B60O 7/12 152/323 |
| 2013/0154342 A1* | 6/2013 | Chiang | A63C 17/22 301/5.308 |
| 2014/0062168 A1 | 3/2014 | Martin et al. | |

FOREIGN PATENT DOCUMENTS

| | | |
|---|---|---|
| GB | 102854 | 3/1917 |
| JP | 2004-161042 | 6/2004 |

* cited by examiner

*Primary Examiner* — J. Allen Shriver, II
*Assistant Examiner* — Hilary L Johns
(74) *Attorney, Agent, or Firm* — Finnegan, Henderson, Farabow, Garrett & Dunner, LLP

(57) ABSTRACT

A non-pneumatic tire may include a hub configured to be coupled to a machine, with the hub having a rotational axis about which the tire is configured to roll. The tire may also include a support structure including an inner circumferential portion associated with the hub and an outer circumferential portion radially spaced from the inner circumferential portion. The support structure may extend between opposed, axially-spaced side edges of the tire, and the support structure may include a plurality of cavities. The tire may also include a tread portion associated with the outer circumferential portion. The support structure may also include a plurality of layers of elastomeric material each having opposing faces lying in opposing planes substantially perpendicular to the rotational axis. At least some of the layers may include apertures corresponding to the cavities, and the layers may be chemically bonded to one another.

19 Claims, 7 Drawing Sheets

LAMINATED NON-PNEUMATIC TIRE

TECHNICAL FIELD

The present disclosure relates to non-pneumatic tires, and more particularly, to non-pneumatic tires including layers of elastomeric material.

BACKGROUND

Machines such as vehicles, either self-propelled or pushed or pulled, often include wheels for facilitating travel across terrain. Such wheels often include a tire to protect a rim or hub of the wheel, provide cushioning for improved comfort or protection of passengers or cargo, and provide enhanced traction via a tread of the tire. Pneumatic tires are an example of such tires. Pneumatic tires include an enclosed cavity for retaining pressurized air, with the enclosed cavity being formed by either a separate annular tube or by a sealed coupling between the tire and a rim of the hub. By virtue of the pressurized air, the tire provides cushioning and shock absorption as the wheel rolls across terrain.

Pneumatic tires, however, may suffer from a number of possible drawbacks. For example, pneumatic tires may deflate due to punctures or air leaks, rendering them unsuitable for use until they are repaired or replaced. In addition, pneumatic tires may be relatively complex due to separate tubes or complex configurations for providing a sealed coupling between the tire and the rim. In addition to these drawbacks, pneumatic tires may suffer from a number of economic drawbacks. For example, due to the relatively complex nature of pneumatic tires, manufacturing facilities for pneumatic tires may be prohibitively costly, requiring a large capital investment. Moreover, pneumatic tires formed from natural rubber may be susceptible to dramatic variability in production costs due to inconsistent availability of natural rubber.

Non-pneumatic tires, such as solid tires or tires not retaining pressurized air, may provide an alternative to pneumatic tires. Non-pneumatic tires may be relatively less complex than pneumatic tires because they do not retain air under pressure. However, non-pneumatic tires may suffer from a number of possible drawbacks. For example, non-pneumatic tires may be relatively heavy and may not be able to provide a desired level of cushioning and support. In addition, it may be relatively costly to produce non-pneumatic tires. For example, molds and associated tooling for making non-pneumatic tires may be relatively costly, particularly for relatively large non-pneumatic tires. In addition, it may be difficult to mold larger sizes of non-pneumatic tires due, for example, to uneven temperatures in the molding material during molding and cooling, and/or difficulties in providing consistent material properties for large amounts of molding material. In addition, it may be difficult to mold non-pneumatic tires having relatively complex designs, thereby limiting design options. This may prevent molded, non-pneumatic tires from achieving desired performance characteristics, such as a desired combination of the level of cushioning and support.

An example of a method of making solid tires for vehicles is disclosed in U.S. Pat. No. 1,806,857 to Liebau ("the '857 patent"). In particular, the '857 patent discloses a method of making solid tires including forming a strip of rubber and folding the strip of rubber so as to provide a plurality of laminations. The folds are pressed together to form a slab having cross-wise extending laminations. The method includes securing the slab to an annular rim with the laminations extending transversely across the circumference of the rim and radially outward from the point of contact with the rim.

Although the method of forming a solid tire disclosed in the '857 patent provides an alternative to molding tires, it may suffer from a number of drawbacks associated with solid tires. For example, the method disclosed in the '857 patent may not be able to form tires having relatively complex designs, for example, to achieve desired characteristics of the finished tire.

The non-pneumatic tire and methods disclosed herein may be directed to mitigating or overcoming one or more of the possible drawbacks set forth above.

SUMMARY

In one aspect, the present disclosure is directed to a non-pneumatic tire. The tire may include a hub configured to be coupled to a machine, with the hub having a rotational axis about which the tire is configured to roll. The tire may also include a support structure including an inner circumferential portion associated with the hub and an outer circumferential portion radially spaced from the inner circumferential portion. The support structure may extend between opposed, axially-spaced side edges of the tire, and the support structure may include a plurality of cavities. The tire may also include a tread portion associated with the outer circumferential portion. The support structure may also include a plurality of layers of elastomeric material each having opposing faces lying in opposing planes substantially perpendicular to the rotational axis. At least some of the layers may include apertures corresponding to the cavities, and the layers may be chemically bonded to one another.

In another aspect, a non-pneumatic tire may include a hub configured to be coupled to a machine, with the hub having a rotational axis about which the tire is configured to roll. The tire may also include a support structure including an inner circumferential portion associated with the hub and an outer circumferential portion radially spaced from the inner circumferential portion. The support structure may extend between opposed, axially-spaced side edges of the tire, and the support structure may include a plurality of cavities. The tire may also include a tread portion associated with the outer circumferential portion. The support structure may include a plurality of layers of elastomeric material including at least one sheet of elastomeric material circumferentially wrapped relative to the hub, such that an interface formed between overlapping surfaces of the at least one sheet of elastomeric material is substantially parallel to the rotational axis. The at least one sheet may include a plurality of apertures corresponding to the cavities, and the overlapping surfaces may be chemically bonded to one another.

In still a further aspect, a tire may include a hub configured to be coupled to a machine, with the hub having a rotational axis about which the tire is configured to roll. The tire may also include a support structure including an inner circumferential portion associated with the hub and an outer circumferential portion radially spaced from the inner circumferential portion. The support structure may extend between opposed, axially-spaced side edges of the tire, and the support structure may include a plurality of cavities. The tire may also include a tread portion associated with the outer circumferential portion. The support structure may also include a plurality of layers of elastomeric material including at least one sheet of elastomeric material circumferentially wrapped relative to the hub such that an interface formed between overlapping surfaces of the at least one sheet of elastomeric material is substantially parallel to the rotational axis. The at least one sheet may further include a plurality of folds providing overlapping folds such that a combination of the circumferential wrapping and the plurality of folds define at least some of the cavities. The overlapping surfaces may be chemically bonded to one another and at least some of the overlapping folds may be chemically bonded to one another.

DETAILED DESCRIPTION

Figure 1:
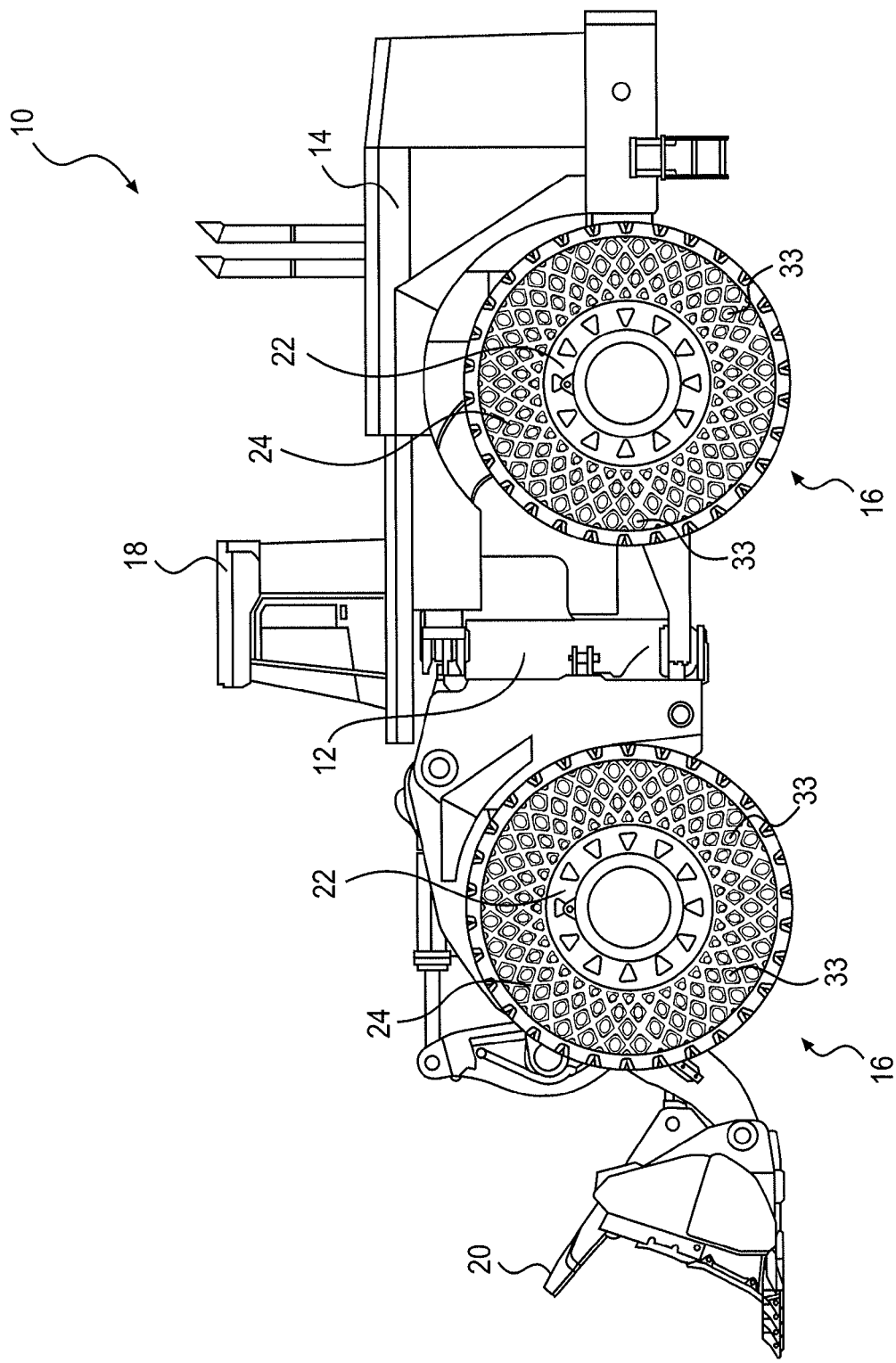
FIG. 1 is a side view of an exemplary embodiment of a machine including an exemplary embodiment of a non-pneumatic tire.

FIG. 1 shows an exemplary machine 10 configured to travel across terrain. Exemplary machine 10 shown in FIG. 1 is a wheel loader. However, machine 10 may be any type of ground-borne vehicle, such as, for example, an automobile, a truck, an agricultural vehicle, and/or a construction vehicle, such as, for example, a dozer, a skid-steer loader, an excavator, a grader, an on-highway truck, an off-highway truck, and/or any other vehicle type known to a person skilled in the art. In addition to self-propelled machines, machine 10 may be any device configured to travel across terrain via assistance or propulsion from another machine.

Exemplary machine 10 shown in FIG. 1 includes a chassis 12 and a powertrain 14 coupled to and configured to supply power to wheels 16, so that machine 10 is able to travel across terrain. Machine 10 also includes an operator station 18 to provide an operator interface and protection for an operator of machine 10. Machine 10 also includes a bucket 20 configured to facilitate movement of material. As shown in FIG. 1, exemplary wheels 16 include a hub 22 coupled to powertrain 14, and tires 24 coupled to hubs 22. Exemplary tires 24 are non-pneumatic tires, such as, for example, polyurethane, non-pneumatic tires.

Figure 2:
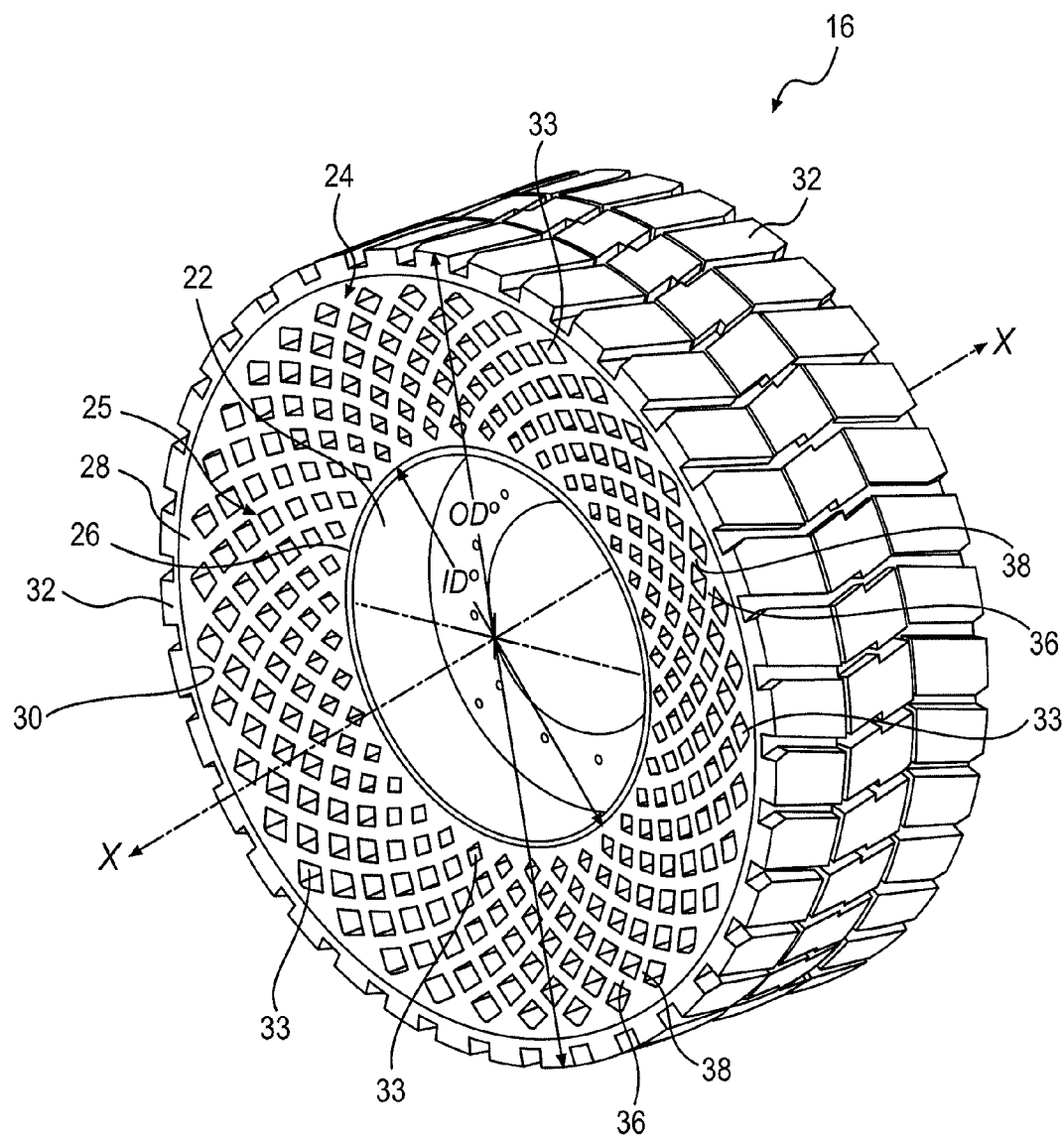
FIG. 2 is a perspective view of an exemplary embodiment of a non-pneumatic tire.
Figure 3:
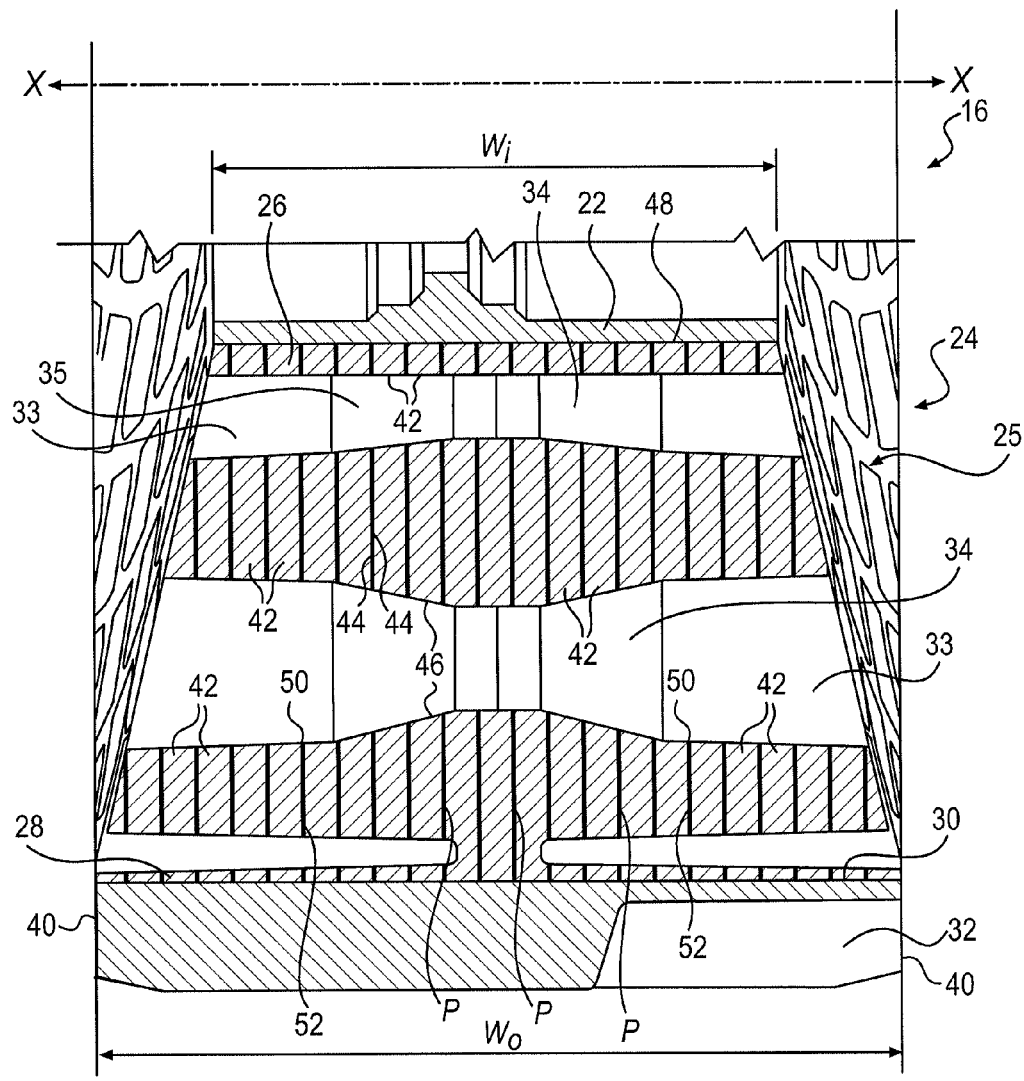
FIG. 3 is a partial section view of an exemplary embodiment of a non-pneumatic tire.

The exemplary tire 24 shown in FIGS. 2 and 3 includes a support structure 25 including an inner circumferential portion 26 configured to be coupled to a hub 22, and an outer circumferential portion 28 configured to be coupled to an inner surface 30 of a tread portion 32 configured to improve traction of tire 24 at the interface between tire 24 and the terrain across which tire 24 rolls. Exemplary support structure 25 extends between inner circumferential portion 26 and outer circumferential portion 28, and exemplary support structure 25 serves to couple inner circumferential portion 26 and outer circumferential portion 28 to one another. As shown in FIGS. 1-7, exemplary tire 24 includes a plurality of cavities 33 configured to provide support structure 25 with a desired level of support and cushioning for tire 24. According to some embodiments, one or more cavities 33 may have an axial intermediate region 34 having a relatively smaller cross-section than the portion of cavities 33 closer to the axial sides of tire 24. Other configurations of cavities are contemplated.

According to some embodiments, hub 22 and/or inner circumferential portion 26 may be configured to facilitate coupling of hub 22 to inner circumferential portion 26. According to some embodiments, support structure 25, inner circumferential portion 26, outer circumferential portion 28, and/or tread portion 32 are formed as a single, monolithic piece. For example, tread portion 32 and support structure 25 may be chemically bonded to one another. For example, the material of tread portion 32 and the material of support structure 25 may be covalently bonded to one another. According to some embodiments, support structure 25, inner circumferential portion 26, and/or outer circumferential portion 28 are formed as a single, monolithic piece, and tread portion 32 is formed separately in time and/or location and is joined to support structure 25, for example, in a mold assembly to form a single, monolithic piece. Even in such embodiments, tread portion 32 and support structure 25 may be chemically bonded to one another. For example, the material of tread portion 32 and the material of support structure 25 may be covalently bonded to one another.

Exemplary tire 24, including inner circumferential portion 26, outer circumferential portion 28, tread portion 32, and support structure 25, may be configured to provide a desired amount of traction and cushioning between a machine and the terrain. For example, support structure 25 may be configured to support the machine in a loaded, partially loaded, and empty condition, such that a desired amount of traction and/or cushioning is provided, regardless of the load.

For example, if the machine is a wheel loader as shown in FIG. 1, when its bucket is empty, the load on one or more of wheels 16 may range from about 60,000 lbs. to about 160,000 lbs. (e.g., 120,000 lbs.). In contrast, with the bucket loaded with material, the load on one or more of wheels 16 may range from about 200,000 lbs. to about 400,000 lbs. (e.g., 350,000 lbs.). Tire 24 may be configured to provide a desired level of traction and cushioning, regardless of whether the bucket is loaded, partially loaded, or empty. For smaller machines, correspondingly lower loads are contemplated. For example, for a skid-steer loader, the load on one or more of wheels 16 may range from about 1,000 lbs. empty to about 3,000 lbs. (e.g., 2,400 lbs.) loaded.

Exemplary support structure 25 shown in FIG. 2 has a plurality of first ribs 36 extending in a first circumferential direction between inner circumferential portion 26 and outer circumferential portion 28. For example, in some embodiments, at least some of first ribs 36 are coupled to inner circumferential portion 26 and outer circumferential portion 28 and extend therebetween, as shown in FIG. 2. Similarly, in some embodiments, support structure 25 includes a plurality of second ribs 38 extending in a second circumferential direction opposite the first circumferential direction between inner circumferential portion 26 and outer circumferential portion 28. For example, in some embodiments, at least some of second ribs 38 are coupled to inner circumferential portion 26 and outer circumferential portion 28 and extend therebetween, as shown in FIG. 2. According to some embodiments, at least some of first ribs 36 and some of second ribs 38 intersect one another such that they share common material at points of intersection. In addition, at least some of first ribs 36 and at least some of second ribs 38 form cavities 33 in support structure 36.

As shown in FIG. 2, according to some embodiments, each of first ribs 36 may have a cross-section perpendicular to the axial direction having a first curvilinear shape. In some embodiments, the first curvilinear shape may be a curve having a single direction of curvature (see, e.g., FIG. 2) as first ribs 36 extend between inner circumferential portion 26 and outer circumferential portion 28. In some embodiments, the first curvilinear shape may be a curve having a direction of curvature that changes once as first ribs 36 extend between inner circumferential portion 26 and outer circumferential portion 28. Similarly, each of second ribs 38 may have a cross-section perpendicular the axial direction of tire 24 having a second curvilinear shape. In some embodiments, the second curvilinear shape may be a curve having a single direction of curvature (see, e.g., FIG. 2) as second ribs 38 extend between inner circumferential portion 26 and outer circumferential portion 28. In some embodiments, the second curvilinear shape may be a curve having a direction of curvature that changes once as second ribs 38 extend between inner circumferential portion 26 and outer circumferential portion 28.

Tire 24 may have dimensions tailored to the desired performance characteristics based on the expected use of the tire. For example, exemplary tire 24 may have an inner diameter ID for coupling with hub 22 ranging from 0.5 meter to 4 meters (e.g., 2 meters), and an outer diameter OD ranging from 0.75 meter to 6 meters (e.g., 4 meters) (see FIG. 2). According to some embodiments, the ratio of the inner diameter of tire 24 to the outer diameter of tire 24 ranges from 0.25:1 to 0.75:1, or 0.4:1 to 0.6:1, for example, about 0.5:1. Support structure 25 may have an inner axial width $W_i$ at inner circumferential portion 26 (see FIGS. 3 and 4) ranging from 0.05 meter to 3 meters (e.g., 0.8 meter), and an outer axial width $W_o$ at outer circumferential portion 28 ranging from 0.1 meter to 4 meters (e.g., 1 meter). For example, exemplary tire 24 may have a trapezoidal cross-section (see FIG. 3). Other dimensions are contemplated. For example, for smaller machines, correspondingly smaller dimensions are contemplated.

According to some embodiments, tread portion 32 is formed from a first polyurethane having first material characteristics, and support structure 25 is formed from a second polyurethane having second material characteristics different than the first material characteristics. According to some embodiments, tread portion 32 is chemically bonded to support structure 25. For example, at least some of the first polyurethane of tread portion 32 is covalently bonded to at least some of the second polyurethane of support structure 25.

As a result of the first material characteristics of the first polyurethane being different than the second material characteristics of the second polyurethane, it may be possible to tailor the characteristics of tread portion 32 and support structure 25 to characteristics desired for those respective portions of tire 24. For example, the second polyurethane of support structure 25 may be selected to be relatively stiffer and/or stronger than the first polyurethane of tread portion 32, so that support structure 25 may have sufficient stiffness and strength to support the anticipated load on tires 24. According to some embodiments, the first polyurethane of tread portion 32 may be selected to be relatively more cut-resistant and wear-resistant and/or have a higher coefficient of friction than the second polyurethane, so that regardless of the second polyurethane selected for support structure 25, tread portion 32 may provide the desired wear and/or traction characteristics for tire 24.

For example, the first polyurethane of tread portion 32 may include polyurethane urea materials based on one or more of polyester, polycaprolactone, and polycarbonate polyols that may provide relatively enhanced abrasion resistance. Such polyurethane urea materials may include polyurethane prepolymer capped with methylene diisocyanate (MDI) that may relatively strongly phase segregate and form materials with relatively enhanced crack propagation resistance. Alternative polyurethanes capped with toluene diisocyanate (TDI), napthalene diisocyanate (NDI), and/or paraphenylene diisocyanate (PPDI) may also be used. Such polyurethane prepolymer materials may be cured with aromatic diamines that may also encourage strong phase segregation. Exemplary aromatic diamines include methylene diphenyl diamine (MDA) that may be bound in a salt complex such as tris(4,4'-diamino-diphenyl methane) sodium chloride (TDDM).

According to some embodiments, the first polyurethane may have a Shore hardness ranging from about from 60A to about 60D (e.g., 85 Shore A). For certain applications, such as those with soft ground conditions, it may be beneficial to form tread portion 32 from a material having a relatively harder durometer to generate sufficient traction through tread penetration. For applications such as those with hard or rocky ground conditions, it may be beneficial to form tread portion 32 from a material having a relatively lower durometer to allow conformability of tread portion 32 around hard rocks.

According to some embodiments, the second polyurethane of support structure 25 may include polyurethane urea materials based on one or more of polyether, polycaprolactone, and polycarbonate polyols that may provide relatively enhanced fatigue strength and/or a relatively low heat buildup (e.g., a low tan δ). For example, for high humidity environments it may be beneficial for the second polyurethane to provide a low tan δ for desired functioning of the tire after moisture absorption. Such polyurethane urea materials may include polyurethane prepolymer capped with methylene diisocyanate (MDI) that may strongly phase segregate and form materials having relatively enhanced crack propagation resistance, which may improve fatigue strength. Alternative polyurethanes capped with toluene diisocyanate (TDI), napthalene diisocyanate (NDI), or paraphenylene diisocyanate (PPDI) may also be used. Such polyurethane prepolymer materials may be cured with aromatic diamines that may also encourage strong phase segregation. Exemplary aromatic diamines include methylene diphenyl diamine (MDA) that may be bound in a salt complex such as tris(4,4'-diamino-diphenyl methane) sodium chloride (TDDM). Chemical crosslinking in the polyurethane urea may provide improved resilience to support structure 25. Such chemical crosslinking may be achieved by any means known in the art, including but not limited to: the use of tri-functional or higher functionality prepolymers, chain extenders, or curatives; mixing with low curative stoichiometry to encourage biuret, allophanate, or isocyanate formation; including prepolymer with secondary functionality that may be cross-linked by other chemistries (e.g., by incorporating polybutadiene diol in the prepolymer and subsequently curing such with sulfur or peroxide cross-linking). According to some embodiments, the second polyurethane of support structure 25 (e.g., a polyurethane urea) may have a Shore hardness ranging from about 80A to about 95A (e.g., 92A).

Some embodiments of tire 24 may include an intermediate portion between outer circumferential portion 28 and inner surface 30 of tread portion 32. For example, outer circumferential portion 28 of support structure 25 may be chemically bonded to inner surface 30 of tread portion 32 via the intermediate portion. For example, the intermediate portion may have an outer circumferential surface chemically bonded to inner surface 30 of tread portion 32, and an inner circumferential surface chemically bonded to outer circumferential portion 28 of support structure 25.

According to some embodiments, the intermediate portion may be formed from a third polyurethane. According to some embodiments, the third polyurethane may be at least similar (e.g., the same) chemically to either the first polyurethane or the second polyurethane. According to some embodiments, the third polyurethane may be chemically different than the first and second polyurethanes. For example, according to some embodiments, the third polyurethane may be mixed with a stoichiometry that is prepolymer rich (e.g., isocyanate rich). That is, in a polyurethane urea system there is a theoretical point where each isocyanate group will react with each curative (amine) functional group. Such a point would be considered to correspond to a stoichiometry of 100%. In a case where excess curative (diamine) is added, the stoichiometry would be considered to be greater than 100%. In a case where less curative (diamine) is added, the stoichiometry would be considered to be less than 100%. For example, if a part is formed with a stoichiometry less than 100%, there will be excess isocyanate functionality remaining in the part. Upon high temperature postcuring of such a part (e.g., subjecting the part to a second heating cycle following an initial, incomplete curing), the excess isocyanate groups will react to form urea linkages, biuret linkages, and isocyanurates through cyclo-trimerization, or crosslinks through allophanate formation. According to some embodiments, the third polyurethane may be chemically similar to the support structure 25 polyurethane, but formulated to range from about 50% to about 90% of theoretical stoichiometry (i.e., from about 50% to about 90% "stoichiometric") (e.g., from about 60% to about 80% stoichiometric (e.g., about 75% stoichiometric)). Such polyurethane urea, even after forming an initial structure following so-called "green curing," is still chemically active through the excess isocyanate functional groups.

According to some embodiments, the intermediate portion may have a different color than one or more of tread portion 32 and support structure 25. This may provide a visual indicator of the wear of tread portion 32. This may also provide a visual indicator when shaving or milling tread portion 32 during a process of retreading tire 24 with a new tread portion. For example, when tread portion 32 becomes undesirably worn, the remaining material of tread portion 32 may be shaved or milled off down to the intermediate portion, so that a new tread portion can be molded onto the intermediate portion of tire 24. By virtue of the intermediate portion being a different color than tread portion 32, it may be relatively easier to determine when sufficient shaving or milling has occurred to expose the intermediate portion.

According to some embodiments, tire 24 may be formed by one or more layers of elastomeric material. For example, support structure 25 and/or tread portion 32 may be formed by sheets of elastomeric material. For example, exemplary tire 24 shown in FIGS. 3 and 4 includes hub 22 hub configured to be coupled to a machine, with hub 22 having a rotational axis X about which tire 24 is configured to roll. Exemplary support structure 25 includes inner circumferential portion 26 associated with hub 22 and outer circumferential portion 28 radially spaced from inner circumferential portion 26, with support structure 25 extending between opposed, axially-spaced side edges 40 of exemplary tire 24. In the exemplary shown, support structure 25 includes a plurality of first ribs 36 extending between inner circumferential portion 26 and outer circumferential portion 28, and at least some of first ribs 36 at least partially form cavities 33 in support structure 25. For example, first ribs 36 and second ribs 38 may partially form cavities 33. Exemplary tire 24 also includes tread portion 32 associated with outer circumferential portion 28.

As shown in FIG. 3, support structure 25 includes a plurality of layers 42 of elastomeric material, each having opposing faces 44 lying in opposing planes P, which are substantially perpendicular to rotational axis X. In the exemplary embodiment shown, at least some of layers 42 include apertures 46 corresponding to cavities 33 (see, e.g., FIG. 4).

According to some embodiments, two or more of layers 42 are chemically bonded to one another, for example, in a manner described previously herein. For example, opposing faces 44 of adjacent layers 42 may be chemically bonded to one another. According to some embodiments, two or more of layers 42 may be covalently bonded to one another. According to some embodiments, two or more of layers 42 may be adhesively bonded to one another, for example, using adhesive described previously herein.

According to some embodiments, the elastomeric material of one or more of layers 42 may be at least partially formed from at least one polymer selected from the group consisting of polyurethane, natural rubber, and synthetic rubber. For example, one or more of layers 42 may be formed from materials previously described herein, such as, for example, first polyurethane, second polyurethane, third polyurethane, or combinations thereof. According to some embodiments, one or more of layers 42 may be an elastomeric sheet product, such as, for example, polyurethane such as a thermoplastic polyurethane (TPU) or a cast thermoset polyurethane. According to some embodiments, one or more layers 42 may be gum rubber-based, such as, for example, natural rubber, styrenebutadiene rubber, butadiene rubber, ethyl propylene diene monomer rubber, or chloroprene rubber.

If layers 42 are polyurethane and two or more of layers 42 are being adhesively bonded to one another, the adhesive may be an adhesive having a similar chemistry to the polyurethane of the layers. For example, the polyurethane layers may be formed to have excess reactivity, for example, by forming the polyurethane with unreacted isocyanate groups. For example, the polyurethane layers may be predisposed such that the stoichiometry includes excess isocyanate, for example, as previously described herein. If layers 42 are gum rubber-based and two or more of layers 42 are being adhesively bonded to one another, the adhesive may be selected to be reacted toward the unsaturated backbone of the base polymer. For example, the adhesive may be selected to be reactive at room temperature and may be catalyzed peroxide (e.g., methyl ethyl ketone peroxide), catalyzed phenolic adhesive, butadiene-based polyurethane adhesive, flexible cyanoacrylate, or zinc salts of xanthates ultra-accelerated sulfur-cured natural rubber adhesive. According to some embodiments, the adhesive may be formulated to be substantially free of solvents and/or volatile organic compounds that may cause blistering or trapped gas within the tire 24. Adhesive may be applied in any known manner including, but not limited to, spraying, dipping, roller-coating, pouring, and brushing.

According to some embodiments, the elastomeric material may be formed via a number of processes. For example, the elastomeric material may be formed in sheets of material according to known methods, such as, for example, casting, extrusion, or extrusion with in-line curing. Such elastomeric sheets may be formed into rolls or sheets and stored prior to producing tires 24. According to some embodiments, the formation of the sheets may be an integrated part of the process of manufacturing tires 24. For example, the elastomeric sheets may be formed via known processes, such as extrusion, with the extruded sheets being formed immediately upstream (i.e., without separate storage prior to use) of the tire-building processes, such that tires 24 are formed adjacent the extrusion process. According to some embodiments, the elastomeric sheets may have self-adhesive properties that may be activated by rapid heating prior to (e.g., immediately prior to) or during formation of tire 24. According to some embodiments, the elastomeric sheets may have self-adhesive properties and may include a liner film that is removed during or after a cutting step.

Figure 4:
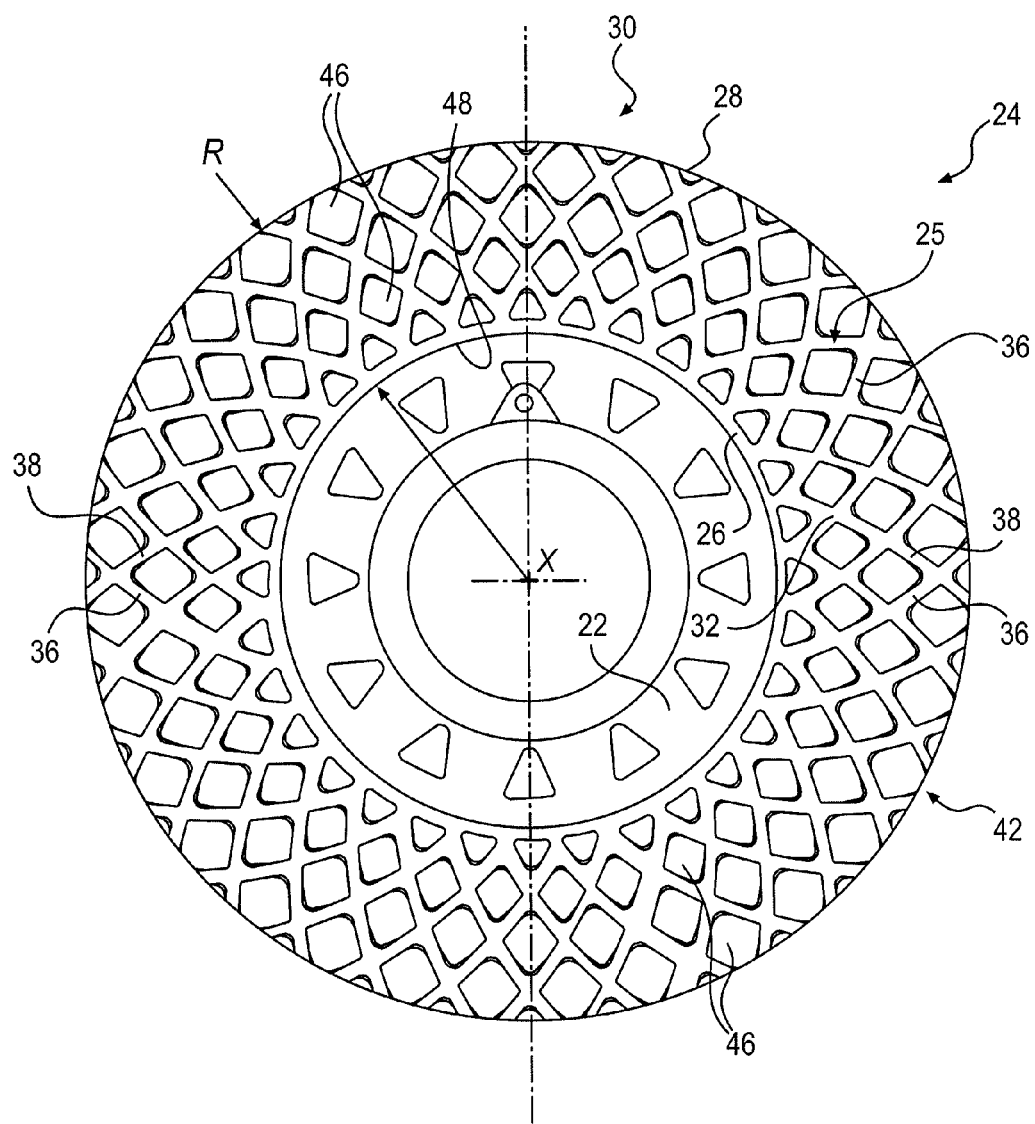
FIG. 4 is a side view of a portion of the exemplary embodiment of tire shown in FIG. 3.

As shown in FIG. 4, for some embodiments of tire 24, at least some of layers 42 are annular layers having a centrally located aperture 48 through which hub 22 is received. For example, tire 24 may be formed such that hub 22 is received in aligned apertures 48 of adjacent annular layers 42, for example, in a manner similar to a number of washers being placed over the shaft of a bolt. One or more of annular layers 42 may be coupled to one another, for example, as described above, to form a monolithic tire structure. According to some embodiments, hub 22 may include one or more flanges at opposing axial ends to assist with retaining one or more of annular layers 42 in a desired axial position relative to hub 22.

According to the exemplary tire 24 shown in FIGS. 3 and 4, at least two adjacent layers 42 each include respective cavity forming apertures 46, and cavity forming apertures 46 correspond to at least a portion of one of cavities 33. For example, as shown in FIG. 3, layers 42 include cavity forming apertures 46, and alignment cavity forming apertures 46 (e.g., radial and/or circumferential alignment) results in apertures 46 forming cavities in tire 24. According to some embodiments, one or more of cavity forming apertures 46 may be formed in layers 42 prior to being associated with hub 22 (e.g., prior in time and at a different location). According some embodiments, cavity forming apertures 46 may be formed after one or more of layers 42 has been associated with hub 22 (e.g., assembled or mounted onto hub 22). For example, one or more of layers 42 may not include cavity forming apertures 46 prior to being mounted onto hub 22, and the cavity forming apertures may be cut-out from tire 24 via a cutting device. Regardless of whether the cavity forming apertures are formed before or after layers 42 are associated with hub 22, such apertures may be formed via any cutting device, such as, for example, a laser cutter, a knife, high-speed milling, a water jet cutter, or other cutting devices and techniques known in the art.

According to some embodiments, an interface 50 is present between two or more adjacent layers 42. For example, interface 50 may be created where opposing faces 44 of adjacent layer 42 are chemically bonded to one another. According to some embodiments, a reinforcing member 52 is associated with at least some of interfaces 50, for example, as shown in FIG. 3. Reinforcing member 52 may include material (e.g., a sheet of material) that enhances a desired characteristic of tire 24. For example, inclusion of one or more reinforcing members 52 may result in enhancing the compressive strength in a direction perpendicular to the reinforcing member 52, while maintaining flexibility in shear. Reinforcing members 52 may include at least one of metal sheet material, fiber reinforcement material, and cable. For example, fiber reinforcement material may include para-aramid synthetic fibers, such as poly-paraphenylene terephthalamide (e.g., KEVLAR®). According to some embodiments, one or more of reinforcing members 52 may include apertures corresponding to one or more of cavity forming apertures 46 of layers 42. According to some embodiments, reinforcing members 52 may be adhesively coupled to layers 42, for example, using adhesive at least similar to those previously discussed. According to some embodiments, reinforcing members 52 may be non-planar and may be embedded in one or more of layers 42, for example, with layers 42 having material removed for receipt of such reinforcing members 52.

According to some embodiments, one or more layers 42 may be formed by at least one sheet of elastomeric material circumferentially wrapped relative to hub 22. For example, as shown in FIGS. 5 and 6, exemplary tire 24 includes at least one sheet of elastomeric material circumferentially wrapped relative to hub 22, such that interface 50 formed between overlapping surfaces of the at least one sheet of elastomeric material is substantially parallel to rotational axis X.

Figure 5:
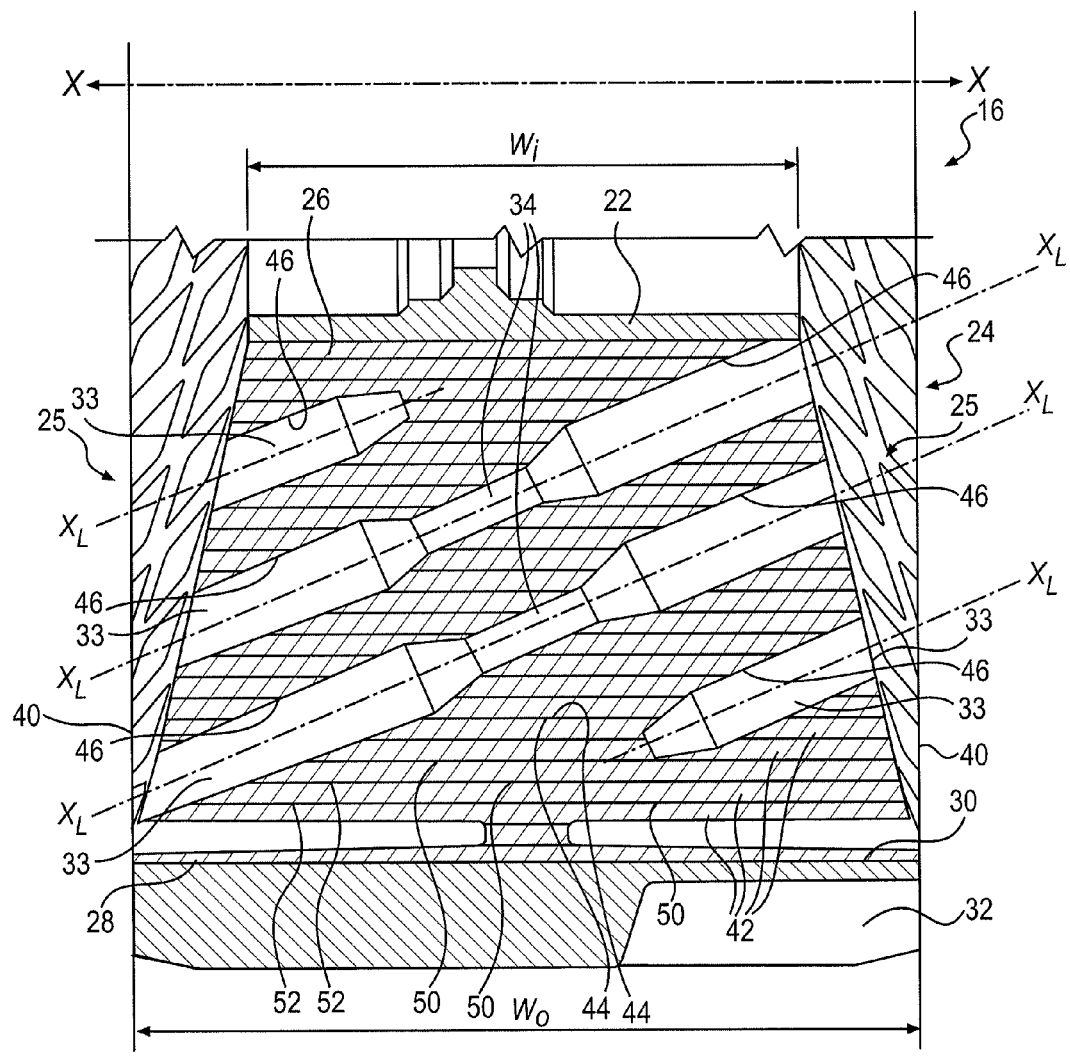
FIG. 5 is a partial section view of another exemplary embodiment of a non-pneumatic tire.
Figure 6:
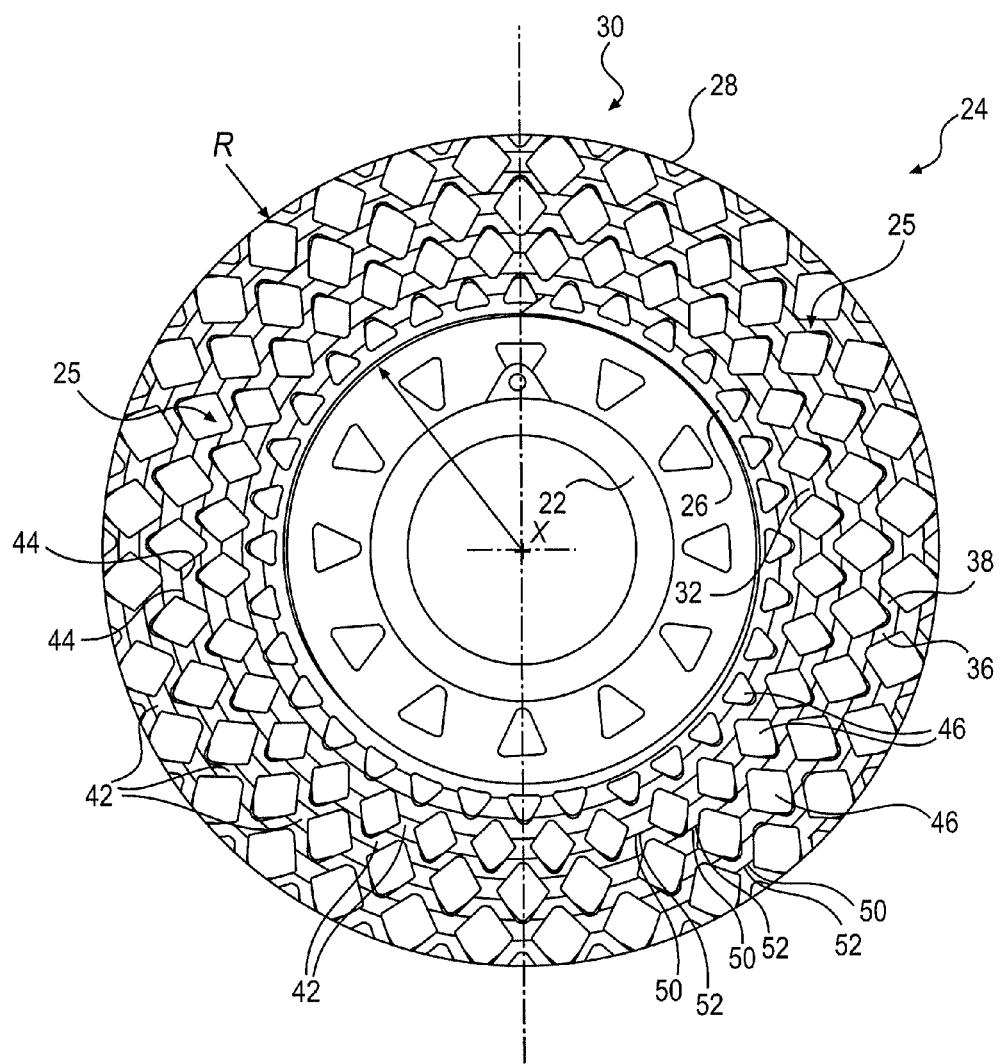
FIG. 6 is a side view of a portion of the exemplary embodiment of tire shown in FIG. 5.

The exemplary embodiment shown in FIGS. 5 and 6 includes hub 22 configured to be coupled to a machine. Exemplary tire 24 also includes support structure 25 including inner circumferential portion 26 associated with hub 22 and outer circumferential portion 28 radially spaced from inner circumferential portion 22, with support structure 25 extending between opposed, axially-spaced side edges 40 of tire 24. According to the exemplary embodiment shown, support structure 25 includes a plurality of first ribs 36 extending between inner circumferential portion 26 and outer circumferential portion 28, with at least some of first ribs 36 at least partially forming cavities 33 in support structure 25. According to some embodiments, tire 24 also includes a plurality of second ribs 38 extending between inner circumferential portion 26 and outer circumferential portion 28, with at least some of second ribs 38 at least partially forming cavities 33 in support structure 25. Exemplary tire 24 also includes tread portion 32 associated with outer circumferential portion 28.

As shown in FIGS. 5 and 6, support structure 25 includes a plurality of layers 42 of elastomeric material including at least one sheet of elastomeric material circumferentially wrapped relative to hub 22, such that interface 50 formed between overlapping surfaces of the at least one sheet of elastomeric material is substantially parallel to rotational axis X. In the exemplary embodiment shown, the at least one sheet includes a plurality of cavity forming apertures 46 corresponding to cavities 33. According to some embodiments, the overlapping surfaces are chemically bonded to one another, for example, as described previously herein.

In the exemplary embodiment show in FIGS. 5 and 6, the at least one sheet of elastomeric material is a single sheet of elastomeric material. For example, the single sheet of elastomeric material is associated with hub 22 (e.g., coupled to hub 22) and wrapped circumferentially around hub 22 in an overlapping manner, for example, in a manner similar to a roll of sheet material wrapped around a core. According to some embodiments, the sheet of elastomeric material may include a plurality of sheets that are sequentially and circumferentially wrapped around hub 22 until the desired tire/support structure diameter is achieved.

According to the exemplary tire shown FIGS. 5 and 6, the elastomeric material may be at least partially formed from at least one polymer selected from the group consisting of polyurethane, natural rubber, and synthetic rubber. For example, the elastomeric material may be any of the materials described previously herein, such as, for example, first polyurethane, second polyurethane, third polyurethane, or combinations thereof.

As shown in FIG. 5, exemplary tire 24 includes cavities 33, wherein at least some of cavities 33 have a longitudinal axis $X_L$ extending obliquely with respect to rotational axis X. Such an exemplary configuration may facilitate wrapping of the elastomeric material without having discontinuities across the width of the material that might occur if cavities 33 such as, for example, those shown in FIG. 3 were present. According to some embodiments, cavities 33 may be inclined but symmetrically mirrored, for example, at the tire centerplane or equatorial plane. According to the exemplary embodiment shown in FIGS. 5 and 6, the at least one sheet of elastomeric material includes a plurality of cavity forming apertures 46, such that overlapping portions of the at least one sheet form at least a portion of cavities 33. According to some embodiments, exemplary tire 24 shown in FIGS. 5 and 6 may include at least one reinforcing member 52 associated with interface 50 between overlapping surfaces of the elastomeric sheet material. Such reinforcing members 52 may take the form of any reinforcing member previously described with respect to FIGS. 3 and 4, such as, for example, at least one of metal sheet material, fiber reinforcement material, and cable.

According to some embodiments, one or more of layers 42 may be formed by at least one sheet of elastomeric material circumferentially wrapped relative to hub 22, such that an interface 50 formed between overlapping surfaces of the at least one sheet of elastomeric material is substantially parallel to rotational axis X, and such that the at least one sheet further includes a plurality of folds 54 providing overlapping folds, such that a combination of the circumferential wrapping and at least some of the plurality of folds 54 define at least some of cavities 33. Such an exemplary configuration may reduce the amount of material removed from layers 42, thereby potentially reducing waste and/or cost.

Figure 7:
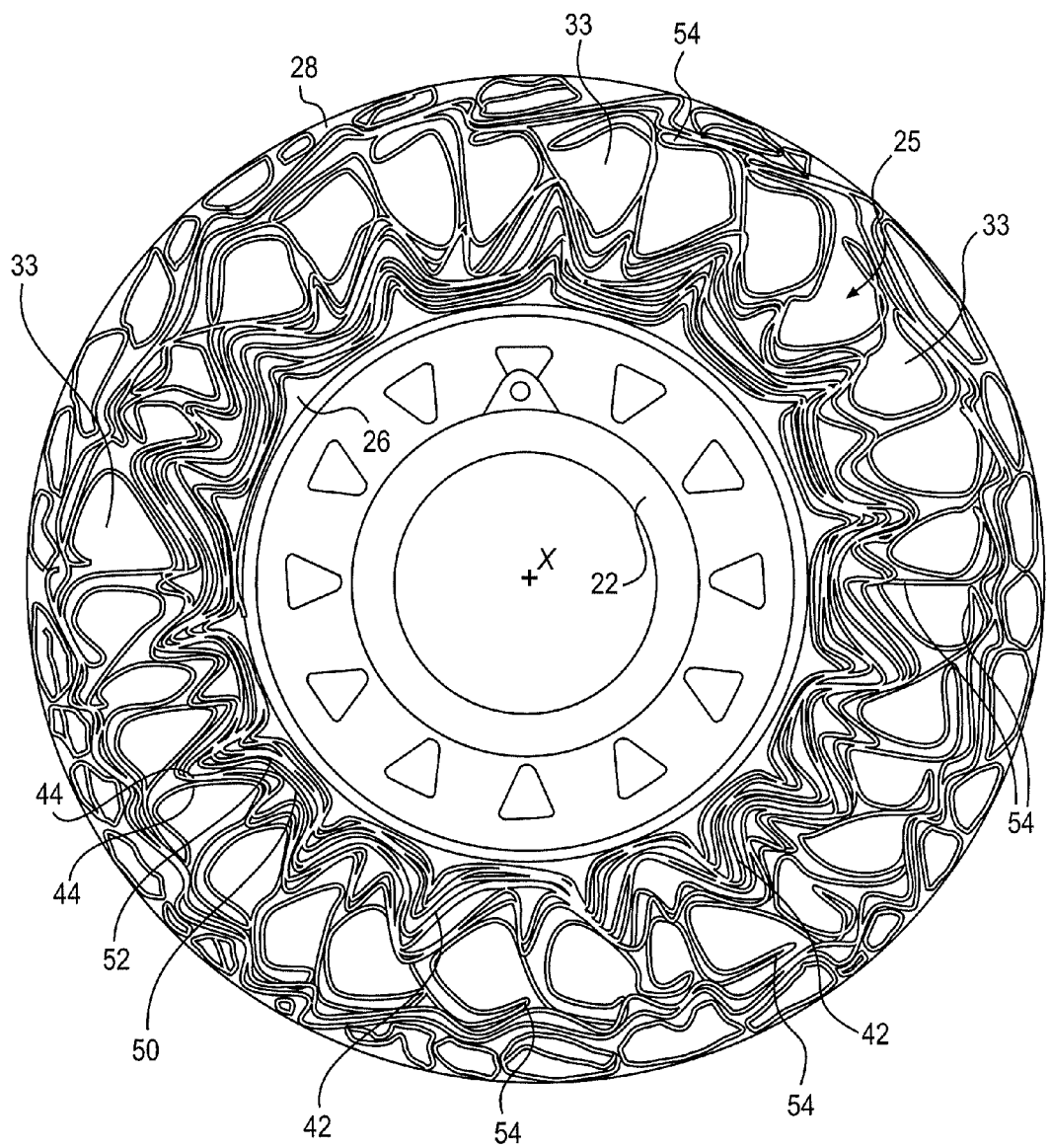
FIG. 7 is a side view of a portion of another exemplary embodiment of a tire.

For example, as shown in FIG. 7, exemplary tire 24 includes hub 22 configured to be coupled to a machine. Support structure 25 includes inner circumferential portion 26 associated with hub 22 and outer circumferential portion 28 radially spaced from inner circumferential portion 26, with support structure 25 extending between opposed, axially-spaced side edges 40 of tire 24. Exemplary tire 24 may also include a tread portion associated with outer circumferential portion 28.

As shown in FIG. 7, support structure 25 includes a plurality of layers 42 of elastomeric material including at least one sheet of elastomeric material circumferentially wrapping relative to hub 22, such that interface 50 formed between overlapping surfaces of the at least one sheet of elastomeric material is substantially parallel to rotational axis X. In this exemplary embodiment, the at least one sheet further includes a plurality of folds 54 providing overlapping folds, such that a combination of the circumferential wrapping and at least some of the plurality of folds 54 define at least some of cavities 33. The overlapping surfaces are chemically bonded to one another, and the overlapping folds are chemically bonded to one another, for example, as described previously herein. For example, the overlapping surfaces are adhesively bonded to one another and the overlapping folds are adhesively bonded to one another.

In the exemplary embodiment show in FIG. 7, the at least one sheet of elastomeric material is a single sheet of elastomeric material. For example, the single sheet of elastomeric material is associated with hub 22 (e.g., coupled to hub 22), and wrapped circumferentially around hub 22 in an overlapping manner and folded manner. According to some embodiments, the at least one sheet of elastomeric material may include a plurality of sheets that are sequentially and circumferentially wrapped around hub 22 until the desired tire/support structure diameter is achieved.

According to the exemplary tire 24 shown FIG. 7, the elastomeric material may be at least partially formed from at least one polymer selected from the group consisting of polyurethane, natural rubber, and synthetic rubber. For example, the elastomeric material may be any of the materials described previously herein, such as, for example, first polyurethane, second polyurethane, third polyurethane, or combinations thereof.

In addition to folds 54 forming cavities, some embodiments may also include a plurality of apertures corresponding to at least a portion of cavities 33. Such apertures may provide additional design flexibility.

According to some embodiments, exemplary tire 24 shown in FIG. 7 may include at least one reinforcing member 52 associated with interface 50 between overlapping surfaces of the elastomeric sheet material and/or overlapping folds. Such reinforcing members 52 may take the form of any reinforcing member previously described with respect to FIGS. 3 and 4, such as, for example, at least one of metal sheet material, fiber reinforcement material, and cable.

INDUSTRIAL APPLICABILITY

The non-pneumatic tires disclosed herein may be used with any machines, including self-propelled vehicles or vehicles intended to be pushed or pulled by another machine. According to some embodiments, the non-pneumatic tires disclosed herein may overcome or mitigate potential drawbacks associated with pneumatic tires and prior non-pneumatic tires.

For example, the non-pneumatic tires disclosed herein may be relatively more reliable than pneumatic tires because they do not necessarily retain air under pressure. Thus, at least some embodiments of the disclosed non-pneumatic tires, unlike pneumatic tires, will not deflate due to punctures or air leaks. Moreover, at least some embodiments of the tires disclosed herein may be less complex than pneumatic tires, which may result in reduced manufacturing costs relative pneumatic tires. In addition, due to the lower complexity, it may be relatively less expensive to create a manufacturing facility for producing at least some of the embodiments of non-pneumatic tires disclosed herein relative to pneumatic tires. For embodiments of non-pneumatic tires disclosed herein that are not formed from a substantial amount of natural rubber, such embodiments may be less susceptible to dramatic variability of production costs due to changes in the cost of natural rubber.

Relative to prior non-pneumatic tires, the non-pneumatic tires disclosed herein may be relatively lighter in weight, and may have an ability to provide a desired level of cushioning and/or support, regardless of whether the load on the tire changes significantly. This may be desirable when non-pneumatic tires are installed on machines that carry loads of widely varying magnitude. For example, the tires of a wheel loader or haul truck may be subjected to a relatively light load when not carrying a load of material, but a relatively high load when carrying a load of material. The non-pneumatic tires disclosed herein may be able to provide a desirable level of cushioning and/or traction in both conditions. In addition, the non-pneumatic tires disclosed herein may be relatively more durable due to the configuration of the support structure. The exemplary support structures disclosed herein may prevent or reduce the likelihood of the support structure collapsing when loaded, which, in turn, may increase the service life of the tire.

In addition, according to some embodiments, the non-pneumatic tires disclosed including layers of elastomeric material may be less costly to produce than molded, non-pneumatic tires, which may require relatively more expensive molds and associated tooling, particularly for relatively large non-pneumatic tires. In addition, because the non-pneumatic tires disclosed herein may include a plurality of layers of elastomeric material, the resulting tires may not suffer from manufacturing challenges that may be associated with molding, such as, for example, uneven temperatures in the molding material during molding or cooling, and/or difficulties in providing consistent material properties for large amounts of molding material. Furthermore, forming the tires with layers of elastomeric material may render it easier to form tires having relatively more complex designs, thereby increasing the design options available.

It will be apparent to those skilled in the art that various modifications and variations can be made to the exemplary disclosed tires and methods. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A non-pneumatic tire comprising:
   a hub configured to be coupled to a machine, the hub having a rotational axis about which the tire is configured to roll;
   a support structure including an inner circumferential portion associated with the hub and an outer circumferential portion radially spaced from the inner circumferential portion, the support structure including a plurality of layers of elastomeric material having opposing faces lying in opposing planes substantially perpendicular to the rotational axis, each of the layers extending radially from the inner circumferential portion of the support structure to the outer circumferential portion, and the plurality of layers together extending axially between opposed, axially-spaced side edges of the tire, wherein the support structure includes a plurality of cavities; and
   a tread portion associated with the outer circumferential portion,
   wherein at least two adjacent layers each include respective cavity forming apertures corresponding to at least a portion of a cavity, and
   wherein the layers are chemically bonded to one another.

2. The tire of claim 1, wherein at least some of the layers are annular layers having a centrally located aperture through which the hub is received.

3. The tire of claim 1, wherein an interface is present between adjacent layers of elastomeric material, and the interface includes a chemical bond between the adjacent layers.

4. The tire of claim 3, further including a reinforcing member associated with at least some of the interfaces.

5. The tire of claim 4, wherein the reinforcing member includes at least one of metal sheet material, fiber reinforcement material, and cable.

6. The tire of claim 1, wherein the elastomeric material is at least partially formed from at least one polymer selected from the group consisting of polyurethane, natural rubber, and synthetic rubber.

7. The tire of claim 1, wherein the layers are adhesively bonded to one another.

8. A non-pneumatic tire comprising:
   a hub configured to be coupled to a machine, the hub having a rotational axis about which the tire is configured to roll;
   a support structure including an inner circumferential portion associated with the hub and an outer circumferential portion radially spaced from the inner circumferential portion, the support structure including a plurality of layers of elastomeric material formed from at least one sheet of elastomeric material wrapped circumferentially relative to the hub such that an interface formed between overlapping surfaces of the at least one sheet of elastomeric material is substantially parallel to the rotational axis, the plurality of layers together extending radially from the inner circumferential portion of the support structure to the outer circumferential portion, and each of the respective layers extending axially between opposed, axially-spaced side edges of the tire, wherein the support structure includes a plurality of cavities; and
   a tread portion associated with the outer circumferential portion,
   wherein the at least one sheet includes a plurality of apertures corresponding to the cavities, and
   wherein the overlapping surfaces are chemically bonded to one another.

9. The tire of claim 8, wherein the at least one sheet of elastomeric material is a single sheet of elastomeric material.

10. The tire of claim 8, wherein at least some of the cavities have a longitudinal axis extending obliquely with respect to the rotational axis.

11. The tire of claim 8, wherein the at least one sheet of elastomeric material includes a plurality of cavity forming apertures, such that overlapping portions of the at least one sheet form at least a portion of the cavities.

12. The tire of claim 8, further including at least one reinforcing member associated with the interface.

13. The tire of claim 12, wherein the reinforcing member includes at least one of metal sheet material, fiber reinforcement material, and cable.

14. The tire of claim 8, wherein the elastomeric material is at least partially formed from at least one polymer selected from the group consisting of polyurethane, natural rubber, and synthetic rubber.

15. The tire of claim 8, wherein the overlapping surfaces are adhesively bonded to one another.

16. A non-pneumatic tire comprising:
   a hub configured to be coupled to a machine, the hub having a rotational axis about which the tire is configured to roll;
   a support structure including an inner circumferential portion associated with the hub and an outer circumferential portion radially spaced from the inner circumferential portion, the support structure extending between opposed, axially-spaced side edges of the tire, wherein the support structure includes a plurality of cavities; and
   a tread portion associated with the outer circumferential portion,
   wherein the support structure includes a plurality of layers of elastomeric material including at least one sheet of elastomeric material circumferentially wrapped relative to the hub such that an interface formed between overlapping surfaces of the at least one sheet of elastomeric material is substantially parallel to the rotational axis, the plurality of layers together extending radially from the inner circumferential portion of the support structure to the outer circumferential portion, and each of the respective layers extending axially between opposed, axially-spaced side edges of the tire, wherein the at least one sheet further includes a plurality of folds providing overlapping folds such that a combination of the circumferential wrapping and the plurality of folds define at least some of the cavities, and wherein the overlapping surfaces are chemically bonded to one another and at least some of the overlapping folds are chemically bonded to one another.

17. The tire of claim 16, wherein the at least one sheet includes a plurality of apertures corresponding to at least a portion of the cavities.

18. The tire of claim 16, wherein the elastomeric material is at least partially formed from at least one polymer selected from the group consisting of polyurethane, natural rubber, and synthetic rubber.

19. The tire of claim 16, wherein the overlapping surfaces are adhesively bonded to one another and at least some of the overlapping folds are adhesively bonded to one another.

* * * * *